United States Patent
Tseng et al.

(10) Patent No.: US 11,391,909 B2
(45) Date of Patent: Jul. 19, 2022

(54) CAMERA MODULE AND ELECTRONIC DEVICE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 435 days.

(21) Appl. No.: 16/427,392

(22) Filed: May 31, 2019

(65) Prior Publication Data

US 2020/0049938 A1 Feb. 13, 2020

(30) Foreign Application Priority Data

Aug. 7, 2018 (TW) ................. 10712748.1

(51) Int. Cl.
*G02B 7/09* (2021.01)
*G03B 13/36* (2021.01)
*G02B 7/02* (2021.01)

(52) U.S. Cl.
CPC ............... *G02B 7/09* (2013.01); *G02B 7/021* (2013.01); *G03B 13/36* (2013.01)

(58) Field of Classification Search
None
See application file for complete search history.

(56) References Cited

U.S. PATENT DOCUMENTS

| 8,995,068 | B2 | 3/2015 | Baik et al. |
| 9,063,275 | B2 | 6/2015 | Park |
| 9,195,026 | B1 | 11/2015 | Chen et al. |
| 9,335,507 | B2 | 5/2016 | Hagiwara |
| 9,781,322 | B2 | 10/2017 | Cho et al. |
| 9,848,126 | B2 | 12/2017 | Kang et al. |
| 2011/0030368 | A1 | 2/2011 | Kume |
| 2011/0222174 | A1 | 9/2011 | Nobe et al. |
| 2011/0235198 | A1 | 9/2011 | Furuya et al. |

(Continued)

FOREIGN PATENT DOCUMENTS

| CN | 101878443 A | 11/2010 |
| CN | 104847823 A | 8/2015 |

(Continued)

*Primary Examiner* — Christopher Stanford
*Assistant Examiner* — Journey F Sumlar
(74) *Attorney, Agent, or Firm* — McClure, Qualey & Rodack, LLP

(57) ABSTRACT

A camera module includes a metal yoke, a holder, a plastic barrel, a plurality of plastic lens elements and a plurality of metal conducting elements. The holder is connected to the metal yoke for forming an inner space. The plastic barrel is movably disposed in the inner space and includes at least one buffering part. The plastic lens elements are disposed in the plastic barrel. The metal conducting elements are at least one leaf spring and a wire element, wherein the metal conducting elements are connected to the plastic barrel. Before the at least one buffering part contacts a contacting part of the at least one leaf spring, there is a gap distance between the at least one buffering part and the contacting part of the at least one leaf spring.

14 Claims, 13 Drawing Sheets

(56) References Cited

U.S. PATENT DOCUMENTS

| | | | |
|---|---|---|---|
| 2013/0194490 A1* | 8/2013 | Okuyama | G02B 27/646 348/374 |
| 2015/0309282 A1* | 10/2015 | Lee | G03B 3/10 359/814 |
| 2016/0178923 A1* | 6/2016 | Hayashi | G02B 27/646 359/557 |
| 2017/0075086 A1* | 3/2017 | Wang | G02B 7/023 |
| 2017/0123180 A1 | 5/2017 | Osaka et al. | |
| 2017/0146770 A1* | 5/2017 | Kuo | G02B 7/10 |
| 2017/0155311 A1* | 6/2017 | Tseng | H02K 41/0356 |
| 2018/0136430 A1* | 5/2018 | Lin | G02B 7/023 |
| 2018/0172944 A1* | 6/2018 | Matsuhisa | G02B 7/08 |
| 2018/0234629 A1* | 8/2018 | Tseng | G02B 7/021 |
| 2019/0278050 A1* | 9/2019 | Lu | H02K 41/0354 |

FOREIGN PATENT DOCUMENTS

| | | |
|---|---|---|
| CN | 104849831 A | 8/2015 |
| CN | 105744125 A | 7/2016 |
| CN | 207195513 U | 4/2018 |
| JP | 2017194628 A | 10/2017 |
| KR | 20070007742 A | 1/2007 |
| TW | 201600898 A | 1/2016 |
| WO | 2010032467 A1 | 3/2010 |

\* cited by examiner

CAMERA MODULE AND ELECTRONIC DEVICE

RELATED APPLICATIONS

This application claims priority to Taiwan Application Serial Number 107127481, filed Aug. 7, 2018, which is herein incorporated by reference in its entirety.

BACKGROUND

Technical Field

The present disclosure relates to a camera module and an electronic device. More particularly, the present disclosure relates to a camera module and an electronic device using a leaf spring.

Description of Related Art

As the change of the times and the progressing of the technique, an electronic device, such as mobile phones and computers, with the imaging function is gradually common. Therefore, the demand of the small electronic device with imaging function having high resolution is also higher and higher. The lens module of the current electronic device achieves the autofocus function by multiple elements, such as the configuration of leaf springs, which provide the moving freedom of the plastic barrel along the optical axis in the inner space of the lens module. Thus, as long as the length and design of the leaf spring permit, the moving range of the plastic barrel can over the inner space. However, when the plastic barrel moves over the moving range in the conventional design, it would result in the problem of mechanical interference, and the problem of the mechanical interference is usually accompanied by abnormal sounds.

Accordingly, it is an important issue to resolve the problem to protect the elements in the inner space from impact and decline the interference of the abnormal sounds.

SUMMARY

According to one aspect of the present disclosure, a camera module includes a metal yoke, a holder, a plastic barrel, a plurality of plastic lens elements and a plurality of metal conducting elements. The holder is connected to the metal yoke for forming an inner space. The plastic barrel is movably disposed in the inner space and includes at least one buffering part. The plastic lens elements are disposed in the plastic barrel. The metal conducting elements are at least one leaf spring and a wire element, wherein the metal conducting elements are connected to the plastic barrel. Before the at least one buffering part contacts a contacting part of the at least one leaf spring, a gap distance between the at least one buffering part and the contacting part of the at least one leaf spring is d, and the following condition is satisfied:

$$0.0 \text{ mm} < d < 0.15 \text{ mm}.$$

According to another aspect of the present disclosure, an electronic device includes the camera module according to the aforementioned aspect and an image sensor disposed on an image surface of the camera module.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
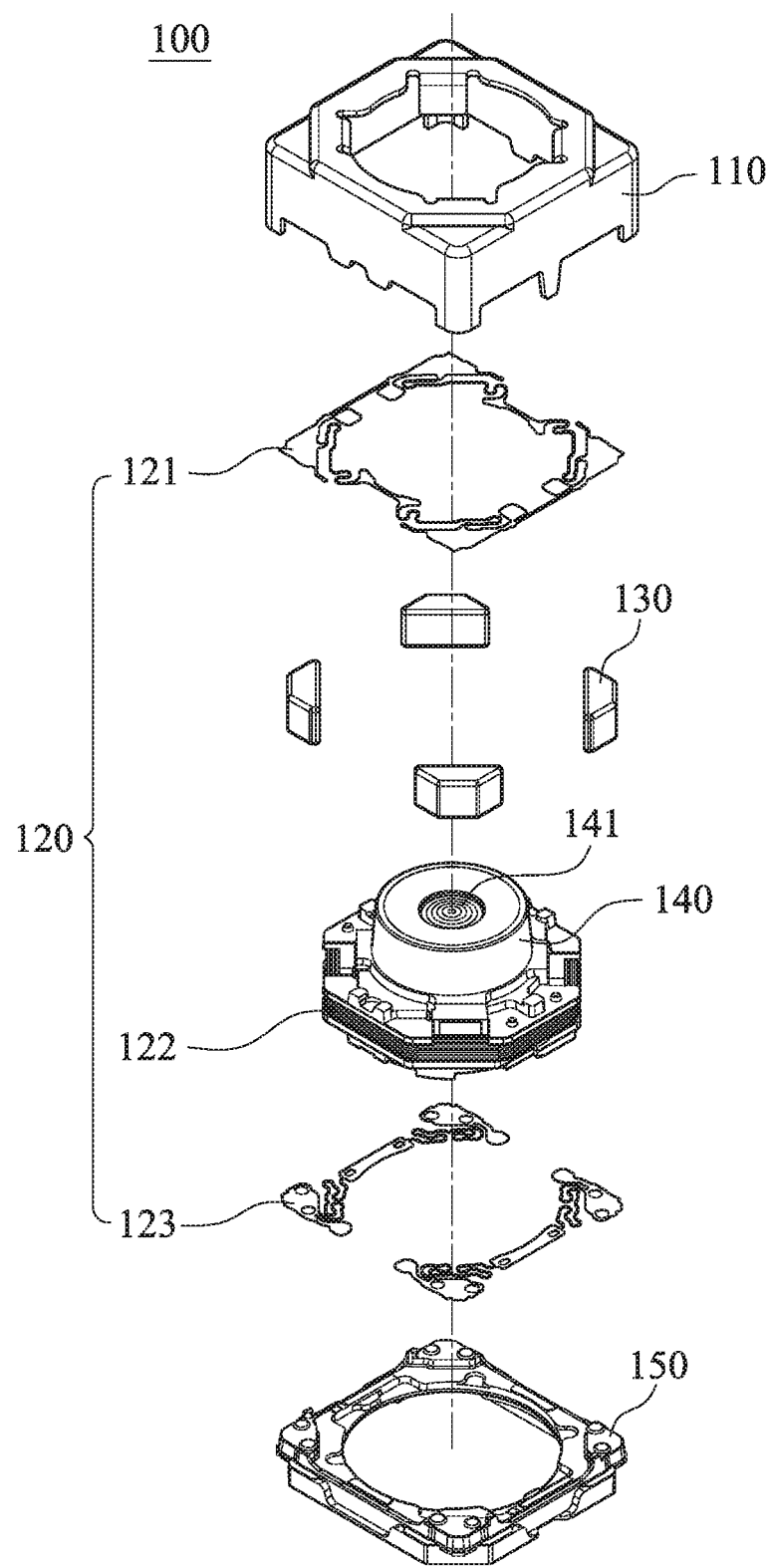
FIG. 1A is an exploded view of a camera module according to the 1st embodiment of the present disclosure.

A camera module includes a metal yoke, a holder, a plastic barrel, a plurality of plastic lens elements and a plurality of metal conducting elements. The holder is connected to the metal yoke for forming an inner space. The plastic barrel is movably disposed in the inner space and includes at least one buffering part. The plastic lens elements are disposed in the plastic barrel. The metal conducting elements are at least one leaf spring and a wire element, wherein the metal conducting elements are connected to the plastic barrel.

Before the at least one buffering part contacts a contacting part of the at least one leaf spring, a gap distance between the at least one buffering part and the contacting part of the at least one leaf spring is d, and the following condition is satisfied: $0.0 \text{ mm} < d < 0.15 \text{ mm}$. In detail, the gap distance between the at least one buffering part and the contacting part of the at least one leaf spring is for ensuring that the plastic barrel of the camera module in the present disclosure has a required focusing distance. When the focusing distance of the plastic barrel exceeds the gap distance, the buffering part contacts the contacting part and the gap distance between them is zero, so the moving resistance for the plastic barrel is increased by the contacting part of the leaf spring to make the plastic barrel gradually stop. It is ensures that the plastic barrel does not continue to move toward the metal yoke or the holder for avoiding the mechanical interference and the accompanying abnormal sounds, so that the buffering effect is achieved.

Furthermore, the aforementioned gap distance between the at least one buffering part and the at least one contacting part of the leaf spring is d, the following condition can be satisfied: 0.0 mm<d<0.10 mm. In this way, the buffering effect under small volume is further achieved without hindering the original autofocus function.

The at least one leaf spring can include an inner side fixing part, an outer side fixing part, and an elastic part. The inner side fixing part is connected to the plastic barrel, the outer side fixing part is connected to one of the metal yoke and the holder, and the elastic part is connected to the inner side fixing part and the outer side fixing part. The structure of the aforementioned leaf spring could be directly applied to the original voice coil motor (VCM), as its necessary leaf spring, without adding another buffering element for the aforementioned buffering effect, so as to effectively decrease the volume and the component number, and improve the convenience of assembly.

The outer side fixing part can include an auxiliary elastic portion, wherein the auxiliary elastic portion is connected to the contacting part, thereby ensuring that the contacting part has elasticity. While the contacting part contacts the buffering part, the auxiliary elastic portion could avoid the direct impact and has the effect for gradually increasing resistance. It is convenient to directly design on the leaf spring of the original voice coil motor, so as to promote the production efficiency of the leaf spring without making additional leaf spring having buffering effect.

A width of the auxiliary elastic portion is t, and the following condition is satisfied: 0.05 mm<t<0.5 mm. If the width of the auxiliary elastic portion is too narrow, it would make the buffering force insufficient, and the buffering effect is not good in a specific distance. If the width of the auxiliary elastic portion is excessively wide, it would make the buffering force excessively strong to easily produce additional metal impact sounds. Therefore, an appropriate buffering force could be provided by the auxiliary elastic portion with an appropriate width.

The width of the auxiliary elastic portion is larger than a width of the elastic part. In this way, the buffering force of the plastic barrel mainly comes from the elasticity of the auxiliary elastic portion for ideally control the buffering effect in a specific distance.

The width of the elastic part is w, the width of the auxiliary elastic portion is t, and the following condition is satisfied: 0.05<w/t<0.95. In this way, the maintenance of a ratio between the width of the elastic part and the width of the auxiliary elastic portion is favorable for fine adjusting the slightly impact situation between the contacting part and the buffering part so as to ideally control the level of the abnormal sounds caused by the impact.

The plastic barrel can be a threadless structure. Therefore, the plastic barrel could be directly assembled with the metal conducting elements to decrease the number of the carrier elements for further effectively reducing the volume of the camera module and decreasing the additional assembly steps.

The at least one buffering part is correspondent to the at least one contacting part, and an area of the at least one buffering part is smaller than an area of the at least one contacting part. In this way, the contacting area between the buffering part and the contacting part is avoided from extending to the auxiliary elastic portion. It is favorable for not affecting an expected buffering effect and also reducing the situation that the plastic barrel is tilted after the plastic barrel is pushed.

The area of the at least one buffering part is Ab, the area of the at least one contacting part is Ac, and the following condition is satisfied: 0.01<Ab/Ac<0.30. By a smaller area ratio, the friction between the buffering part and the contacting part would be decreased to make the buffering effect simpler, being not cause the additional problems.

The inner side fixing part, the elastic part, and the contacting part of the at least one leaf spring are arranged in a ring shape. In this way, the position of the contacting part is as far as possible to be close to the plastic barrel for preventing the plastic barrel from tilting after the plastic barrel is pushed, simultaneously, decreasing the area occupied by the leaf spring.

The outer side fixing part of the at least one leaf spring is farther from the plastic barrel than the contacting part from the plastic barrel. In this way, the supporting fulcrums of the auxiliary elastic portions are all farther from the plastic barrel, so that the curving directions of each two of the auxiliary elastic portions face each other to eliminate the side stress perpendicular to an optical axis.

Before the plastic barrel contacts at least one of the metal yoke and the holder, the at least one buffering part of the plastic barrel contacts the contacting part of the leaf spring. When the focusing position of the camera module is adjusted from a far position to a near position, the plastic barrel is close toward the image surface and then is gradually away from the image surface, which causes the holder become the most easily collided element of the camera module. The contacting part of the leaf spring, which contacts the buffering part in advance, could stop the collision in a limited distance before the plastic barrel collides to the holder.

A number of the leaf spring is at least two, and the at least two leaf springs are respectively an upper leaf spring and a lower leaf spring. The upper leaf spring is connected to one end of the plastic barrel farther from the holder, and the lower leaf spring is connected to the other end of the plastic barrel closer to the holder. The configuration of the upper leaf spring and the lower leaf spring provides the plastic barrel with the degree of freedom along the optical axis in the inner space formed by the metal yoke and the holder. When the leaf spring with buffering effect is applied to the original voice coil motor, the camera module could be protected by the buffering effect under different shooting scenes and maintain the best shooting effect.

A number of the buffering part is at least two, and the at least two buffering parts are respectively an upper buffering part and a lower buffering part. The upper buffering part is connected to the end of the plastic barrel farther from the holder, the lower buffering part is connected to the other end of the plastic barrel closer to the holder, and a projection of the upper buffering part and a projection of the lower buffering part which are both along a direction from the plastic barrel to the holder are not overlapped. In this way, the elongating action and shortening action of the elastic part are avoided being excessively located on the specific positions without the buffering parts, so as to prevent the excessive burden on the partial elastic part.

The present disclosure also provides an electronic device, including the aforementioned camera module and an image sensor, wherein the image sensor is disposed on an image surface of the camera module. Accordingly, when the electronic device is used, the problem of mechanical interference and the accompanying abnormal sounds can be prevented.

According to the above descriptions, the specific embodiments and reference drawings thereof are given below so as to describe the present disclosure in detail.

1st Embodiment

Figure 1B:
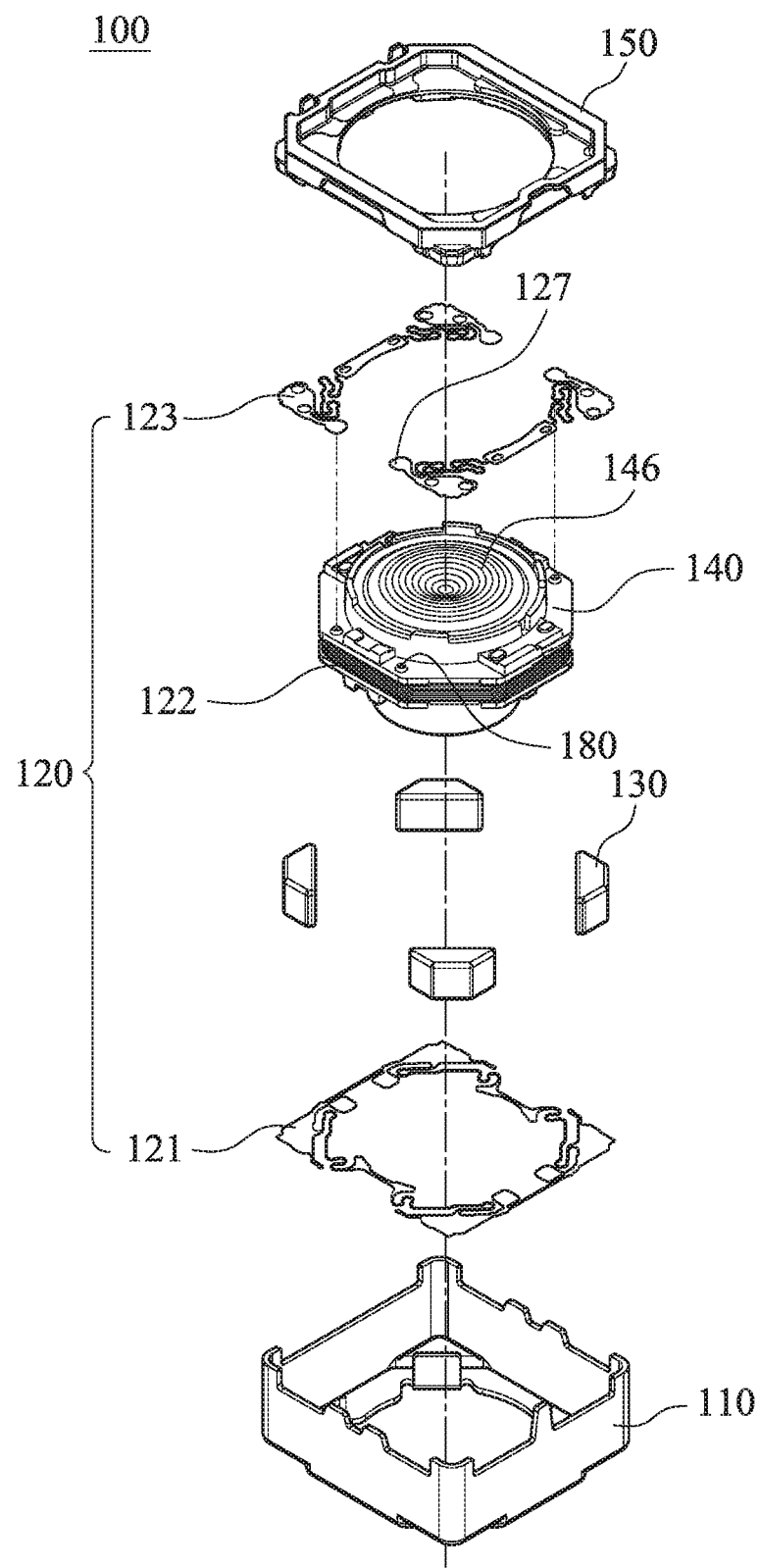
FIG. 1B is another exploded view of the camera module according to the 1st embodiment in FIG. 1A.
Figure 2:
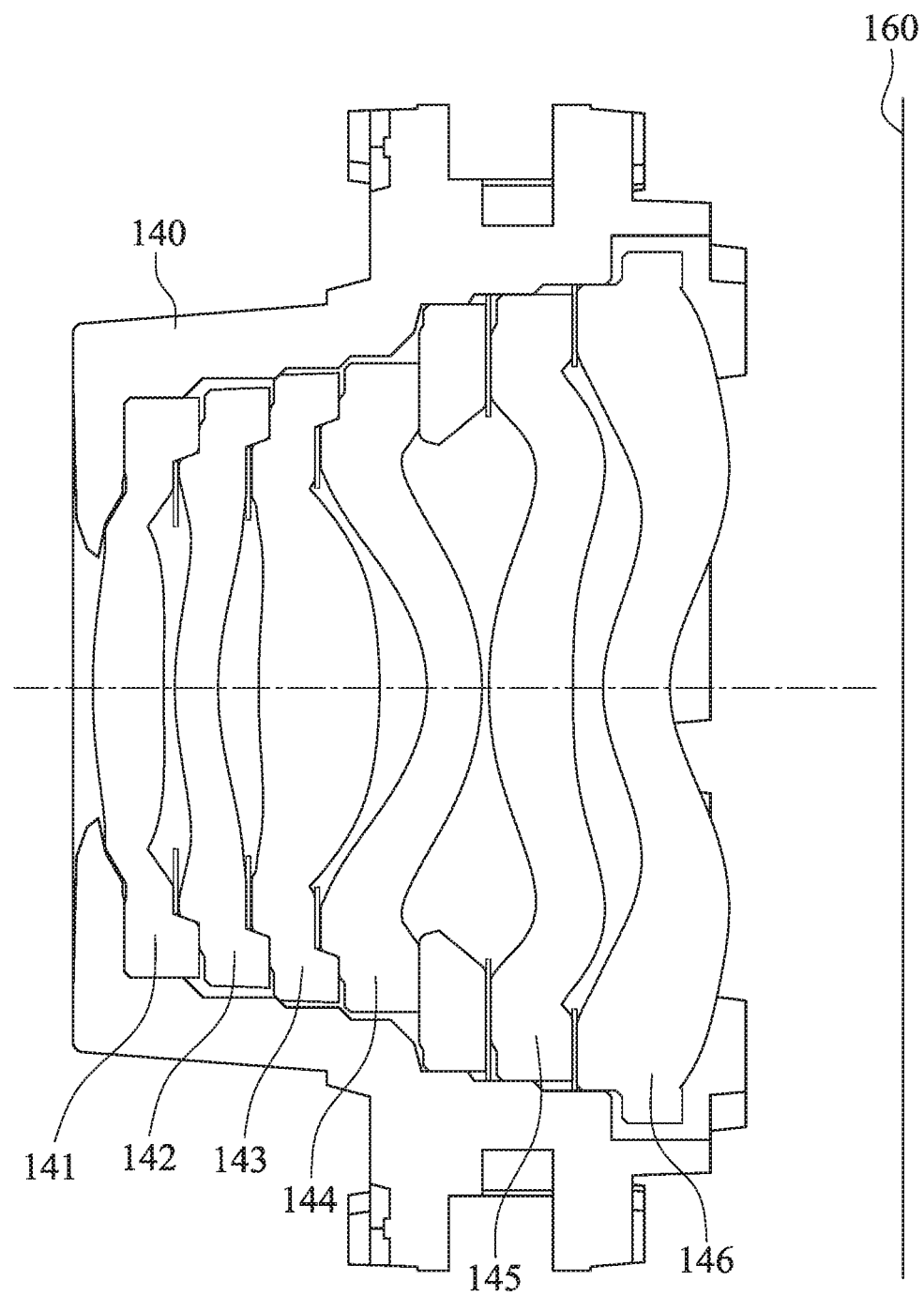
FIG. 2 is a schematic view of a plastic barrel according to the 1st embodiment in FIG. 1A.

FIG. 1A is an exploded view of a camera module 100 according to the 1st embodiment of the present disclosure. FIG. 1B is another exploded view of the camera module 100 according to the 1st embodiment in FIG. 1A. FIG. 2 is a schematic view of a plastic barrel 140 according to the 1st embodiment in FIG. 1A. As shown in FIG. 1A, FIG. 1B, and FIG. 2, the camera module 100 includes a metal yoke 110, a holder 150, a plastic barrel 140, a plurality of plastic lens elements and a plurality of metal conducting elements 120. The holder 150 is connected to the metal yoke 110 for forming an inner space (reference number is not shown). The plastic barrel 140 is movably disposed in the inner space and includes at least one buffering part. The plastic lens elements are disposed in the plastic barrel 140. The metal conducting elements 120 are at least one leaf spring and a wire element 122, which are connected to the plastic barrel 140.

In detail, the camera module 100 includes the metal yoke 110, the metal conducting elements 120, the plastic barrel 140, the plastic lens elements and the holder 150, and can further include a magnet 130 and an image surface 160. The metal yoke 110 is connected to the holder 150 for forming an inner space, and the plastic barrel 140 is a threadless structure and is movably disposed in the inner space. The magnet 130 is connected to the plastic barrel 140, and the image surface 160 is disposed on the image side of the camera module 100. The plastic lens elements are disposed in the plastic barrel 140, and the plastic lens elements are a first plastic lens element 141, a second plastic lens element 142, a third plastic lens element 143, a forth plastic lens element 144, a fifth plastic lens element 145, and a sixth plastic lens element 146. The metal conducting elements 120 are an upper leaf spring 121, a wire element 122 and a lower leaf spring 123. The upper leaf spring 121, the wire element 122 and the lower leaf spring 123 are directly connected to the plastic barrel 140 without through other additional elements. The upper leaf spring 121 is connected to one end of the plastic barrel 140 farther from the holder 150, and the lower leaf spring 123 is connected to the other end of the plastic barrel 140 closer to the holder 150.

Figure 3A:
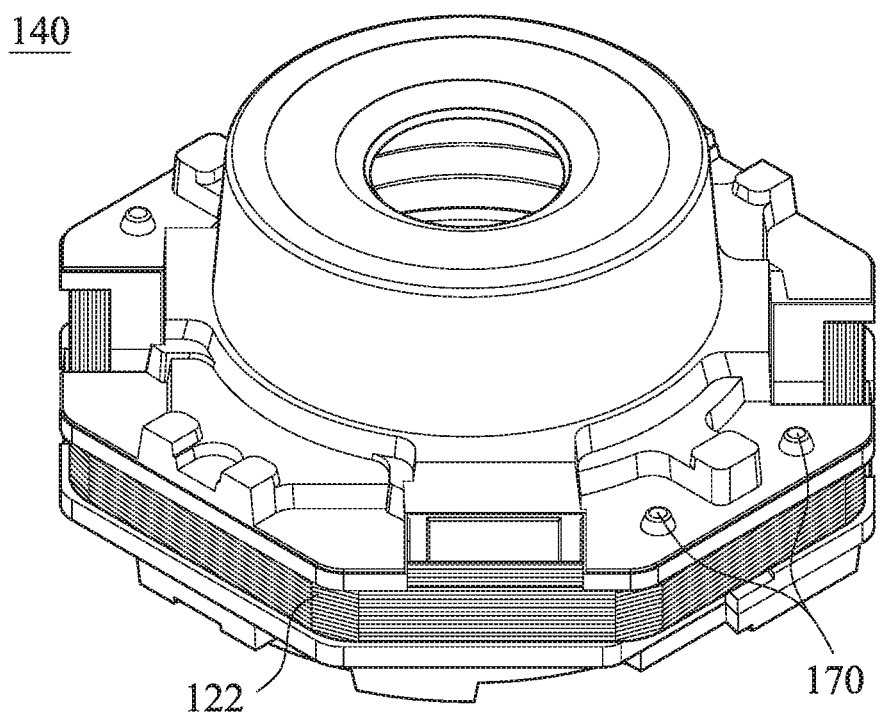
FIG. 3A is a three-dimensional view of the plastic barrel according to the 1st embodiment in FIG. 1A.
Figure 3B:
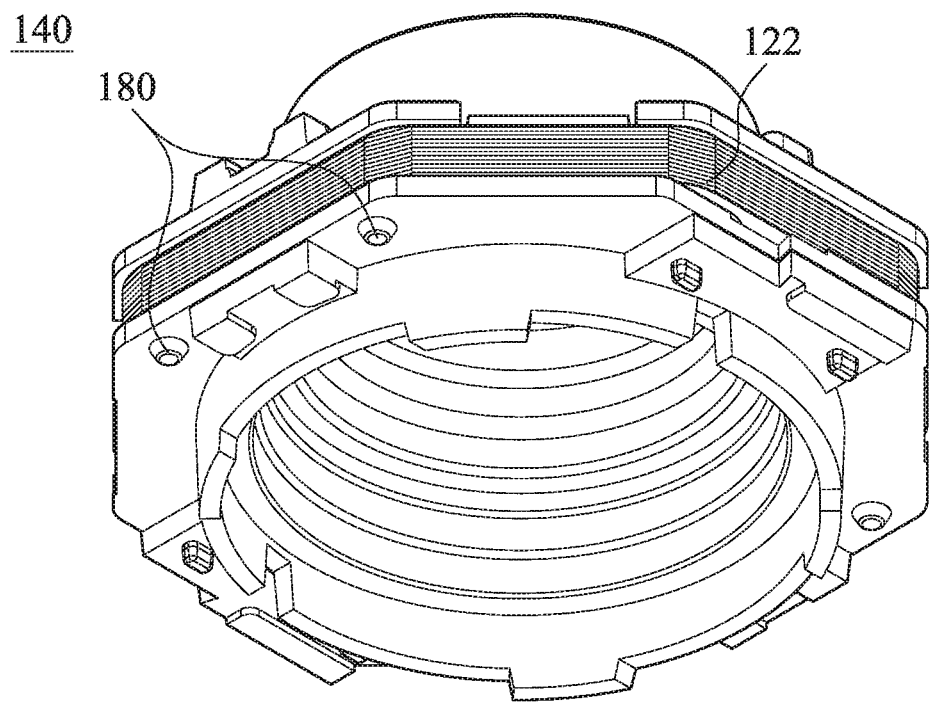
FIG. 3B is another three-dimensional view of the plastic barrel according to the 1st embodiment in FIG. 1A.
Figure 3C:
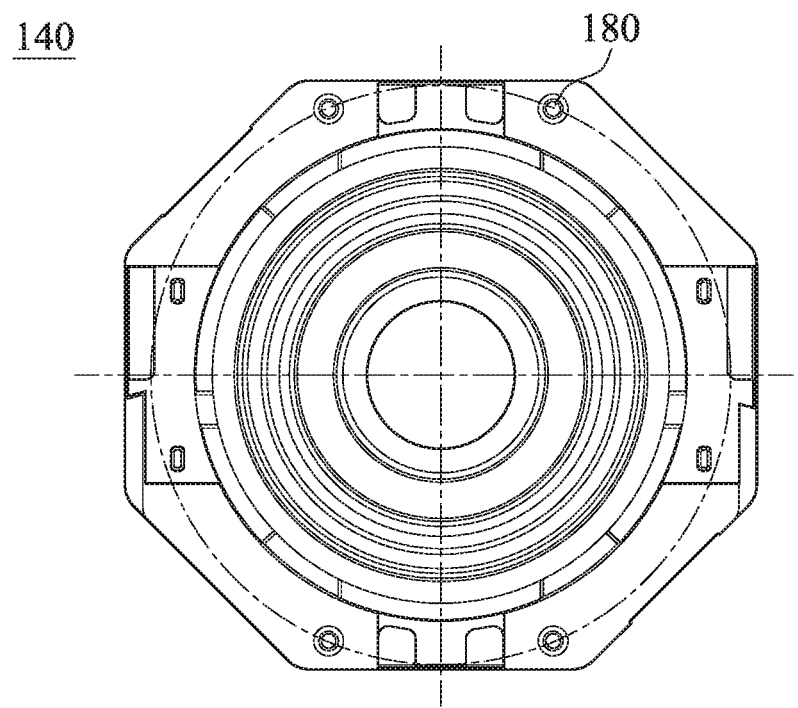
FIG. 3C is a bottom view of the plastic barrel according to the 1st embodiment in FIG. 1A.
Figure 3D:
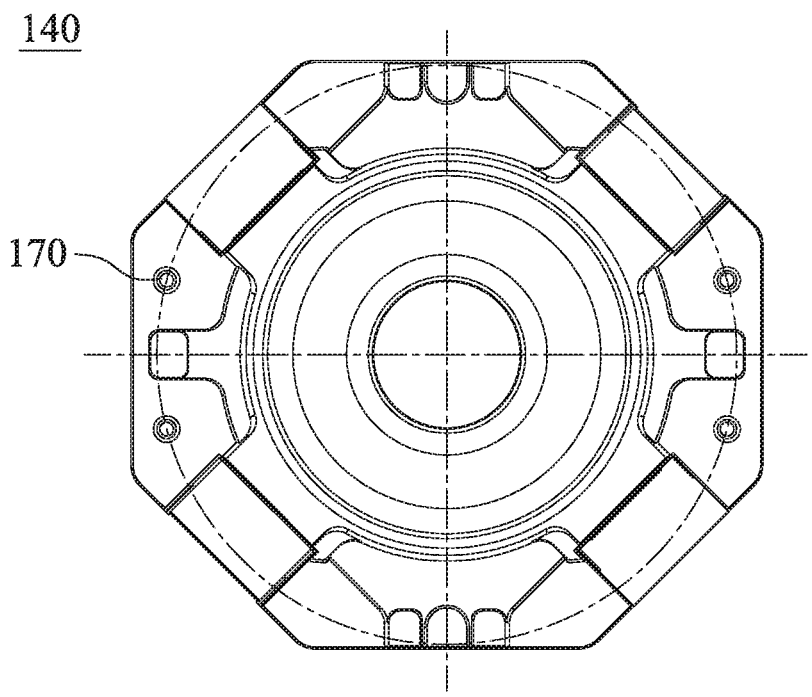
FIG. 3D is a top view of the plastic barrel according to the 1st embodiment in FIG. 1A.

FIG. 3A is a three-dimensional view of a plastic barrel 140 according to the 1st embodiment in FIG. 1A. FIG. 3B is another three-dimensional view of the plastic barrel 140 according to the 1st embodiment in FIG. 1A. FIG. 3C is a bottom view of the plastic barrel 140 according to the 1st embodiment in FIG. 1A. FIG. 3D is a top view of the plastic barrel 140 according to the 1st embodiment in FIG. 1A. As shown in FIG. 3A, FIG. 3B, FIG. 3C, and FIG. 3D, the plastic barrel 140 includes at least one buffering part. In detail, the plastic barrel 140 includes eight buffering parts. One end of the plastic barrel 140 farther from the holder 150 includes four buffering parts, which are four upper buffering parts 170. The other end of the plastic barrel 140 closer to the holder 150 includes four buffering parts, which are four lower buffering parts 180. Projections of the upper buffering parts 170 and projections of the lower buffering parts 180 which are both along a direction from the plastic barrel 140 to the holder 150 are not overlapped.

Figure 4A:
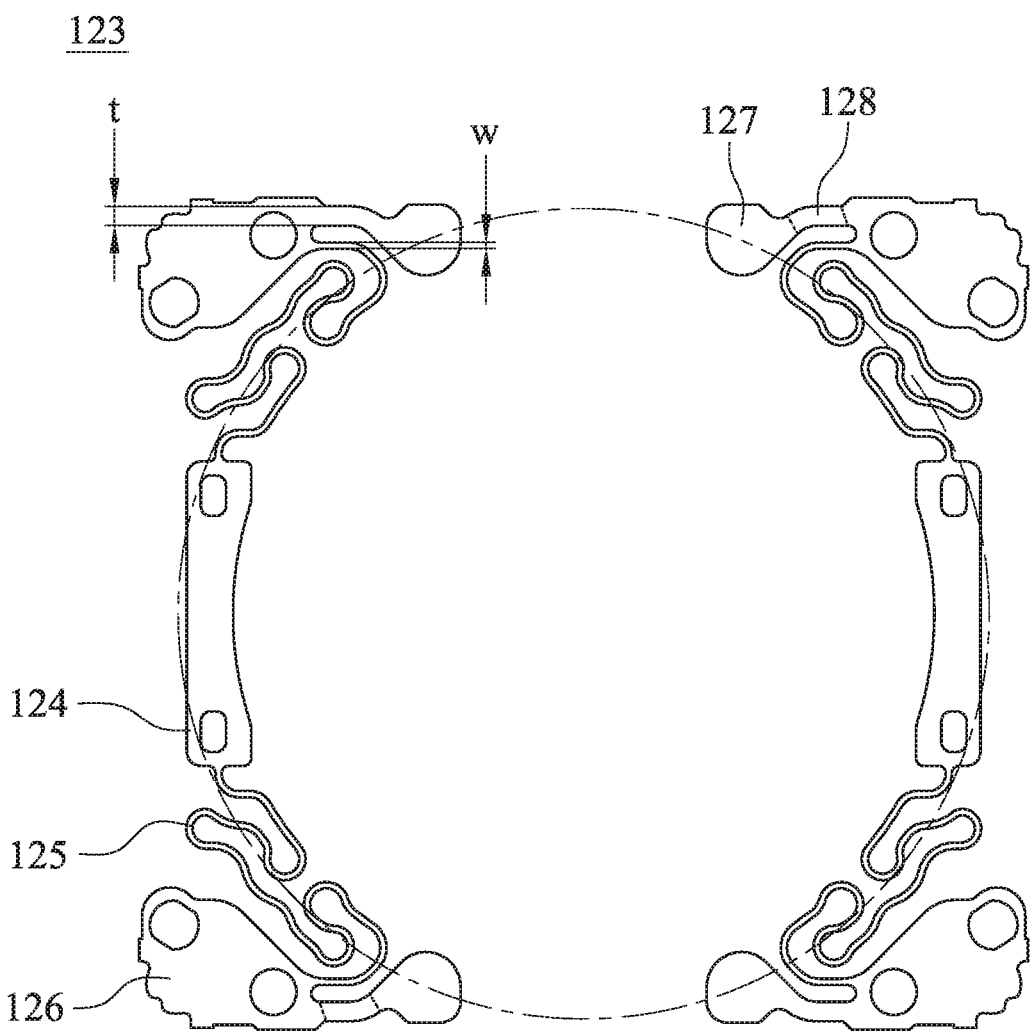
FIG. 4A is a top view of a lower leaf spring according to the 1st embodiment in FIG. 1A.

FIG. 4A is a top view of a lower leaf spring 123 according to the 1st embodiment in FIG. 1A. As shown in FIG. 4A, the lower leaf spring 123 includes an inner side fixing part 124, an elastic part 125, an outer side fixing part 126 and a contacting part 127. The elastic part 125 connects the inner side fixing part 124 and the outer side fixing part 126. The outer side fixing part 126 is connected to the holder 150 and includes an auxiliary elastic portion 128, which is connected to the contacting part 127. The lower leaf spring 123 includes four contacting parts 127, being respectively correspondent to the four lower buffering parts 180 of the plastic barrel 140 (as shown in FIG. 1B). The inner side fixing part 124, the elastic part 125, and the contacting part 127 are arranged in a ring shape, and the auxiliary elastic portion 128 of the outer side fixing part 126 is farther from the plastic barrel 140 than the contacting part 127 from the plastic barrel 140.

A width of the auxiliary elastic portion 128 is t, and the following condition is satisfied: 0.05 mm<t<0.5 mm. A width of the elastic part 125 is w, the width t of the auxiliary elastic portion 128 is larger than the width w of the elastic part 125, and the following condition is satisfied: 0.05<w/t<0.95. In the 1st embodiment, t is 0.14 mm, w is 0.045 mm, and w/t is 0.32.

Figure 4B:
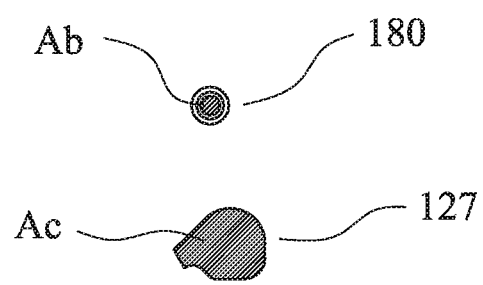
FIG. 4B is a projection area of a contacting part and a projection area of a lower buffering part which are both along a direction from the plastic barrel to the holder according to the 1st embodiment in FIG. 1A.

FIG. 4B is a projection area of the contacting part 127 of the lower leaf spring 123 and a projection area of the lower buffering part 180 of the plastic barrel 140 which are both along a direction from the plastic barrel 140 to the holder 150 according to the 1st embodiment in FIG. 1A. As shown in FIG. 4B, an area of the lower buffering part 180 is smaller than an area of the contacting part 127. The area of the lower buffering part 180 is Ab, the area of the contacting part 127 is Ac, and the following condition is satisfied: 0.01<Ab/Ac<0.30. In the 1st embodiment, Ab is 0.015 mm$^2$, Ac is 0.2413 mm$^2$, and Ab/Ac is 0.0622.

In the 1st embodiment of FIG. 1A, the configuration relationship between the upper leaf spring 121 and the upper buffering part 170 is the same as the aforementioned configuration relationship between the lower leaf spring 123 and the lower buffering part 180, and will not be described herein again.

Figure 5:
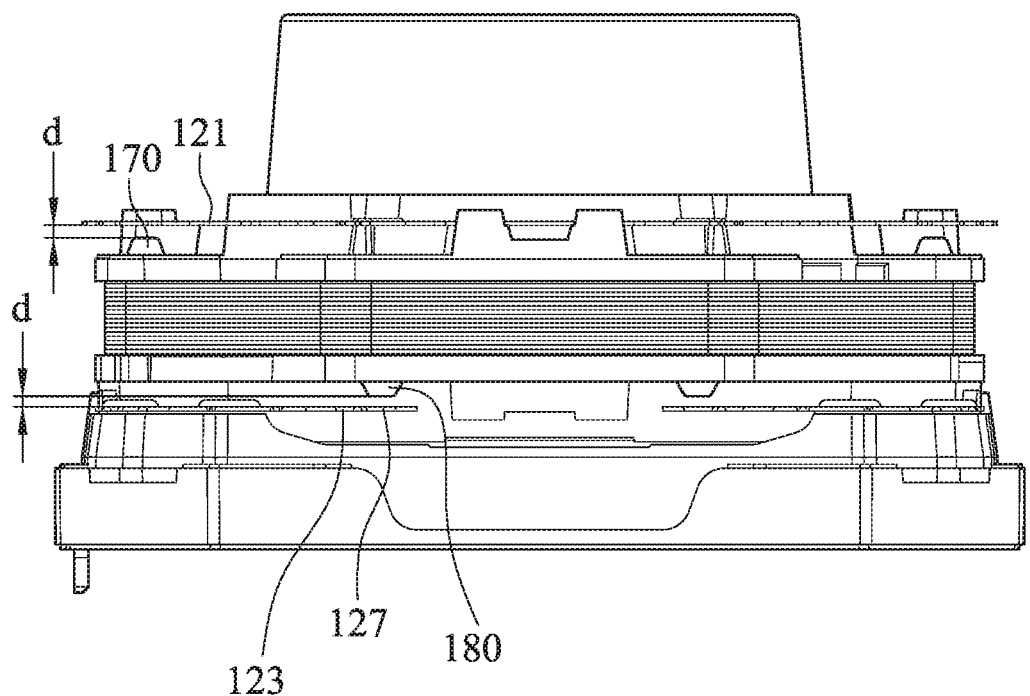
FIG. 5 is a schematic view of the camera module according to the 1st embodiment in FIG. 1A.

FIG. 5 is a schematic view of the camera module 100 according to the 1st embodiment in FIG. 1A. As shown in FIG. 5, before the buffering part contacts the contacting part of the leaf spring, a gap distance d between the buffering part and the contacting part of the leaf spring is d, and the following condition is satisfied: 0.0 mm<d<0.15 mm. Moreover, the following condition is satisfied: 0.0 mm<d<0.10 mm. In the 1st embodiment, a gap distance d between the buffering part and the contacting part of the leaf spring is 0.09 mm (that is the gap distance between the upper buffering part 170 and the upper leaf spring 121), another gap distance d between the buffering part and the contacting part of the leaf spring is 0.076 mm (that is the gap distance between the lower buffering part 180 and the contacting part 127 of the lower leaf spring 123). Furthermore, before the plastic barrel 140 contacts at least one of the metal yoke 110 and the holder 150, the lower buffering part 180 of the plastic barrel 140 contacts the contacting part 127 of the lower leaf spring 123 first.

2nd Embodiment

Figure 6:
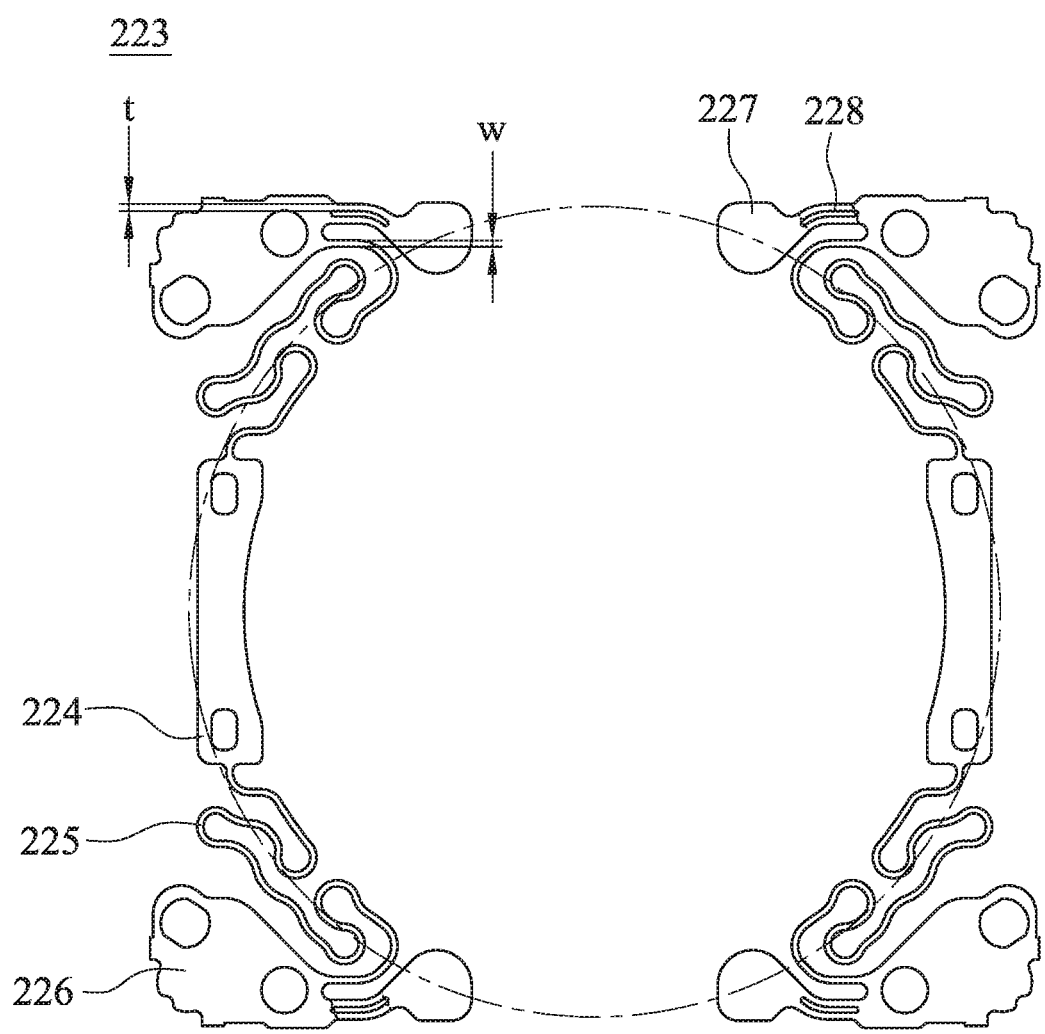
FIG. 6 is a top view of a lower leaf spring of a camera module according to the 2nd embodiment of the present disclosure.

FIG. 6 is a top view of a lower leaf spring 223 of a camera module according to the 2nd embodiment of the present disclosure. As shown in FIG. 6, the lower leaf spring 223 includes an inner side fixing part 224, an elastic part 225, an outer side fixing part 226, and a contacting part 227, wherein the elastic part 225 connects the inner side fixing part 224 and the outer side fixing part 226, and the outer side fixing part 226 is connected to the holder (not shown in figures) and includes an auxiliary elastic portion 228, which is connected to the contacting part 227. The lower leaf spring 223 includes four contacting parts 227, being respectively correspondent to four lower buffering parts (not shown in figures) of the plastic barrel (not shown in figures). The inner side fixing part 224, the elastic part 225 and the contacting part 227 are arranged in a ring shape, and the auxiliary elastic portion 228 of the outer side fixing part 226 is farther from the plastic barrel than the contacting part 227 from the plastic barrel. Furthermore, the lower leaf spring 223 is directly connected to the plastic barrel without through other additional elements, and the lower leaf spring 223 is connected to one end of the plastic barrel closer to the holder.

A width of the auxiliary elastic portion 228 is t, and the following condition is satisfied: 0.05 mm<t<0.5 mm. A width of the elastic part 225 is w, the width t of the auxiliary elastic portion 228 is larger than the width w of the elastic part 225, and the following condition is satisfied: 0.05<w/t<0.95. In the 2nd embodiment, t is 0.05 mm, w is 0.045 mm, and w/t is 0.9.

Furthermore, the other structures and the configuration of the camera module in the 2nd embodiment are the same as those in the 1st embodiment, and will not be described herein again.

3rd Embodiment

Figure 7A:
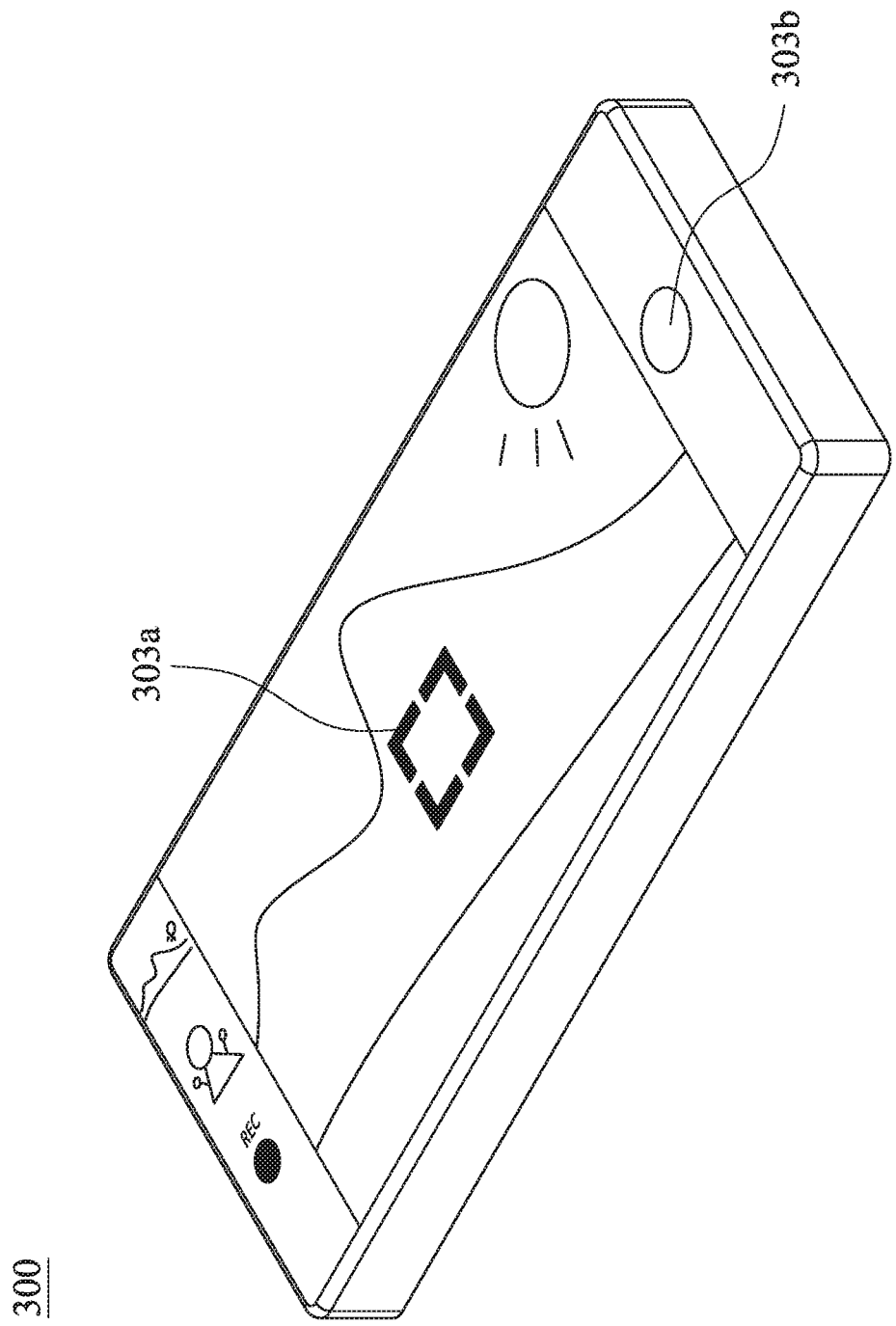
FIG. 7A is a schematic view of an electronic device according to the 3rd embodiment of the present disclosure.
Figure 7B:
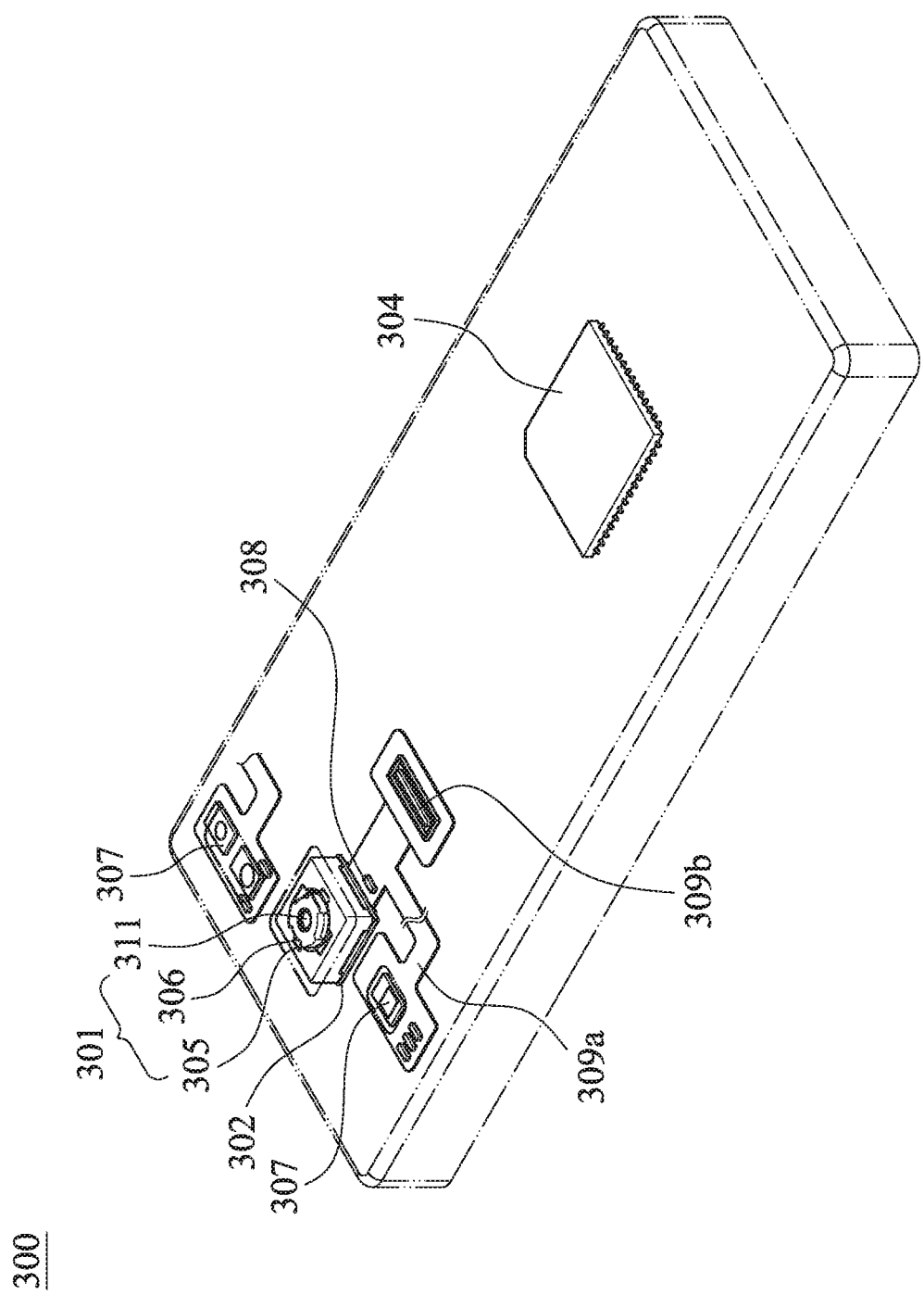
FIG. 7B is another schematic view of the electronic device according to the 3rd embodiment of the present disclosure.

FIG. 7A is a schematic view of an electronic device 300 according to the 3rd embodiment of the present disclosure. FIG. 7B is another schematic view of the electronic device 300 according to the 3rd embodiment of the present disclosure. As shown in FIG. 7A and FIG. 7B, the electronic device 300 of the 3rd embodiment is a smartphone and includes the camera module 301 according to the present disclosure and an image sensor 302. The image sensor 302 is disposed on an image surface (not shown in figures) of the camera module 301. Accordingly, it contributes to meet the requirement of the appearance and the mass production of the imaging apparatus assembled on the electronic device in the current electronic device market.

Specifically, the user activates the capturing mode by the user interface 303 of the electronic device 300, wherein the user interface of the 3rd embodiment can be a touch screen 303a, a button 303b, etc. At this moment, the camera module 301 converges imaging light on the image sensor 302 and outputs electronic signals associated with images to an image signal processor (ISP) 304.

Figure 7C:
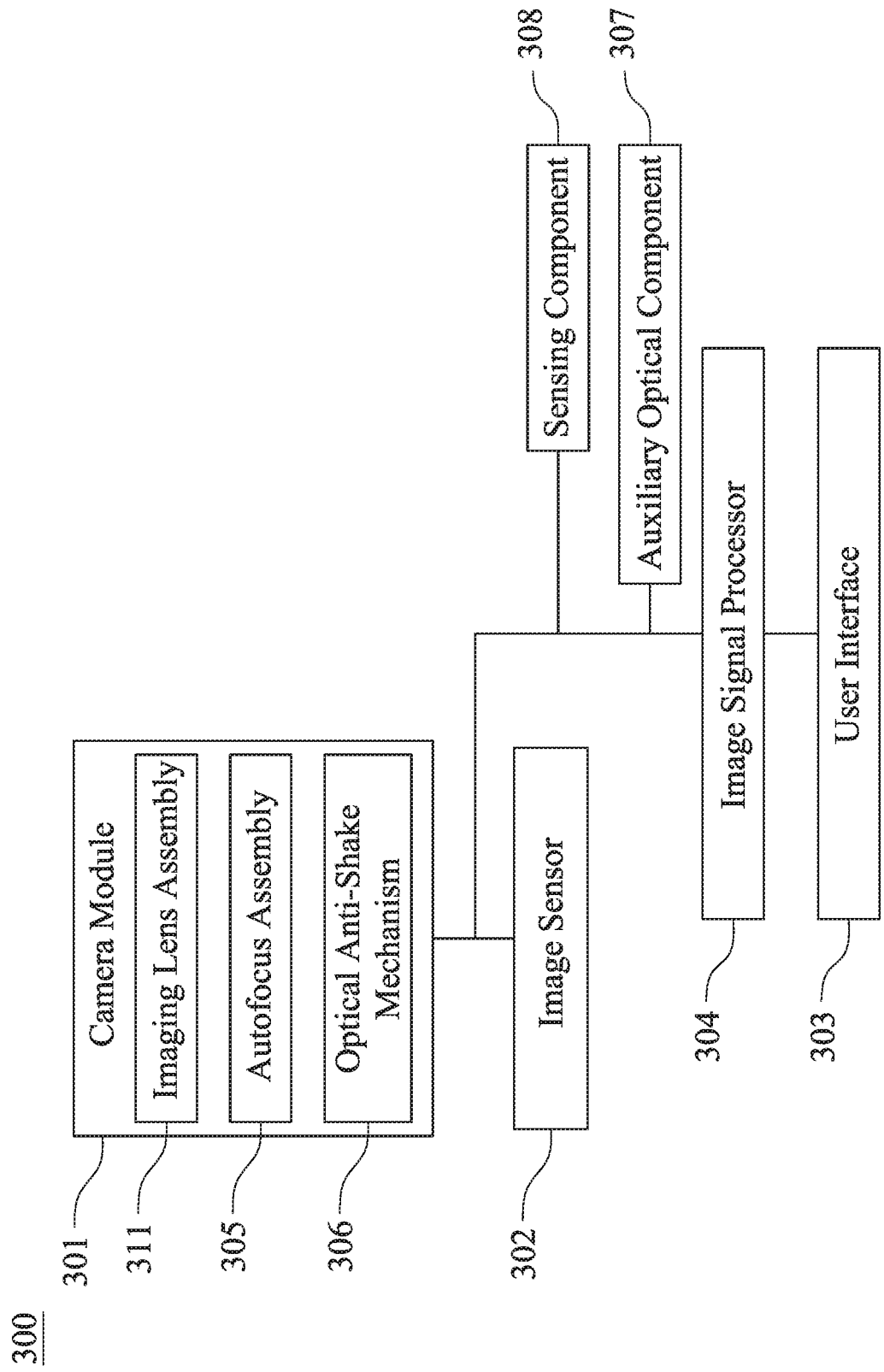
FIG. 7C is a block diagram of the electronic device according to the 3rd embodiment of the present disclosure.

FIG. 7C is a block diagram of the electronic device 300 according to the 3rd embodiment of the present disclosure, especially the block diagram of the camera of the electronic device 300. As shown in FIG. 7A, FIG. 7B and FIG. 7C, in response to the camera specification of the electronic device 300, the camera module 301 includes an imaging lens assembly 311 (including a plastic barrel and a plastic lens element) and an autofocus assembly 305 (at least including a leaf spring which is not shown in figures), and can further include an optical anti-shake mechanism 306. Moreover, the electronic device 300 can further include at least one auxiliary optical component 307 and at least one sensing component 308. The auxiliary optical component 307 can be a flash module for compensating color temperatures, an infrared distance measurement component, a laser focus module, etc. The sensing component 308 can have functions for sensing physical momentum and kinetic energies, such as an accelerator, a gyroscope, and a hall effect element, so as to sense shaking or jitters applied by hands of the user or external environments, thus the autofocus assembly 305 and the optical anti-shake mechanism 306 disposed on the camera module 301 can function to obtain great image quality and facilitate the electronic device 300 according to the present disclosure to have a capturing function with multiple modes, such as taking optimized selfies, high dynamic range (HDR) with a low light source, 4K resolution recording, etc. Furthermore, the user can visually see the captured image of the camera through the touch screen and manually operate the view finding range on the touch screen to achieve the auto focus function of what you see is what you get.

Furthermore, as shown in FIG. 7B, the camera module 301, the image sensor 302, the sensing component 308 and the auxiliary optical component 307 can be disposed on a flexible printed circuit board (FPC) 309a and electrically connected with the associated elements, such as an image signal processor 304, by a connector 309b so as to perform a capturing process. Because the current electronic devices, such as smartphone, have a tendency of being light and thin, the way of disposing the camera module, the imaging lens thereof and related elements on the flexible printed circuit board and then integrating the circuit into the main board of the electronic device via the connector can satisfy the mechanical design of the limited space inside the electronic device and the layout requirements, and obtain more margins. The autofocus function of the camera module can be controlled more flexibly via the touch screen of the electronic device. In the 3rd embodiment, the electronic device 300 includes multiple sensing components 308 and multiple auxiliary optical components 307, and the sensing components 308 and the auxiliary optical components 307 are disposed on the flexible printed circuit board 309a and at least one other flexible printed circuit board (reference number is not shown), and electrically connected with the associated elements, such as an image signal processor 304, by a connector so as to perform a capturing process. In other embodiments (not shown in figures), the sensing components and the auxiliary optical components can also be disposed on the main board of the electronic device or carrier boards in other forms according to requirements of the mechanical design and the circuit layout.

Moreover, the electronic device 300 can further include, but not be limited to, a display, a control unit, a storage unit, a random-access memory (RAM), a read-only memory (ROM), or the combination thereof.

4th Embodiment

Figure 8:
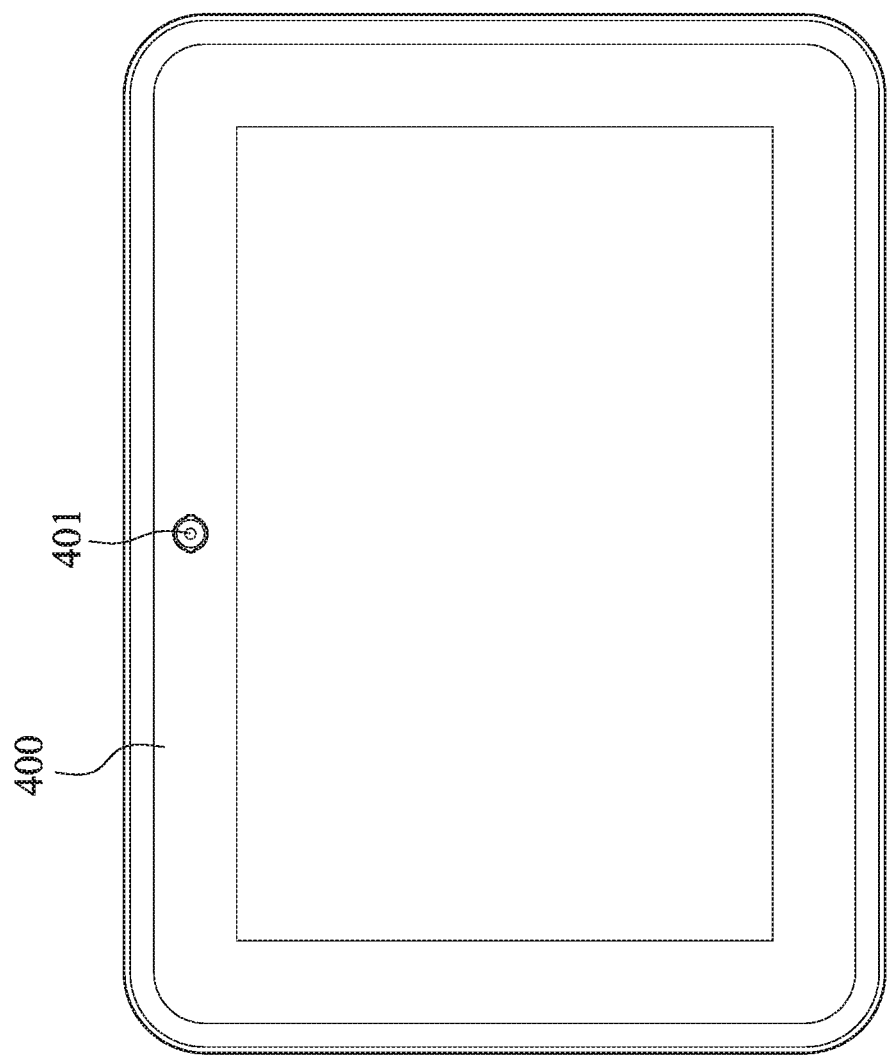
FIG. 8 is a schematic view of an electronic device according to the 4th embodiment of the present disclosure.

FIG. 8 is a schematic view of an electronic device 400 according to the 4th embodiment of the present disclosure. The electronic device 400 of the 4th embodiment is a tablet, and the electronic device 400 includes a camera module 401 according to the present disclosure and an image sensor (not shown in figures), wherein the image sensor is disposed on an image surface (not shown in figures) of the camera module 401.

5th Embodiment

Figure 9:
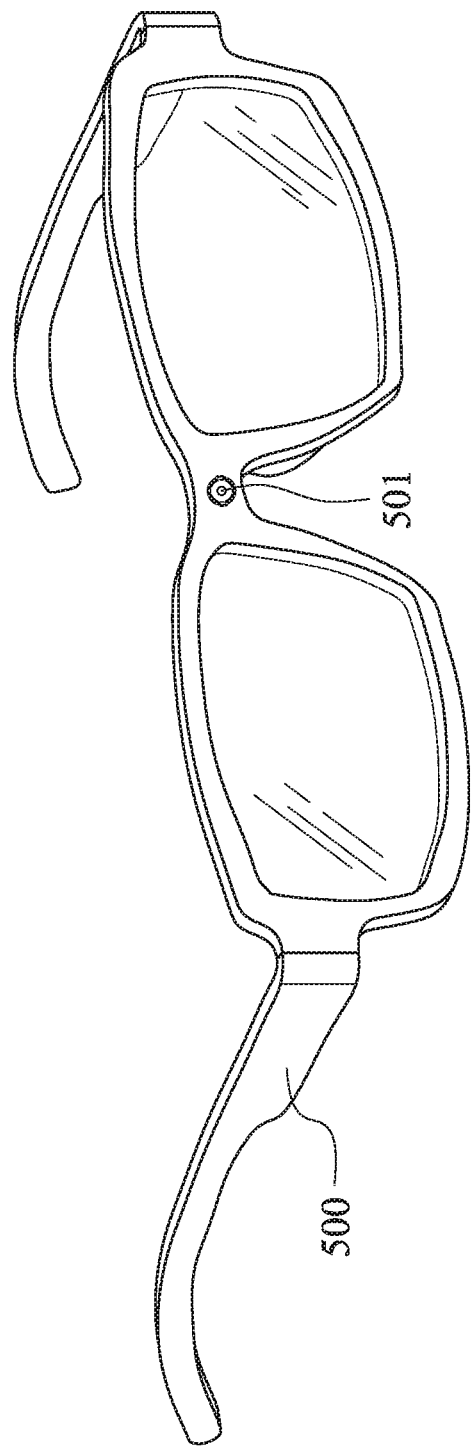
FIG. 9 is a schematic view of an electronic device according to the 5th embodiment of the present disclosure.

FIG. 9 is a schematic view of an electronic device 500 according to the 5th embodiment of the present disclosure. The electronic device 500 of the 5th embodiment is a wearable device, and the electronic device 500 includes a camera module 501 according to the present disclosure and an image sensor (not shown in figures), wherein the image sensor is disposed on an image surface (not shown in figures) of the camera module 501.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A camera module, comprising:
a metal yoke;
a holder connected to the metal yoke for forming an inner space;
a plastic barrel movably disposed in the inner space, wherein the plastic barrel comprises at least one buffering part;
a plurality of plastic lens elements disposed in the plastic barrel; and
a plurality of metal conducting elements being at least one leaf spring and a wire element, wherein the metal conducting elements are connected to the plastic barrel, and the at least one leaf spring comprises:
an inner side fixing part connected to the plastic barrel;
an outer side fixing part connected to one of the metal yoke and the holder, and comprising an auxiliary elastic portion, wherein the auxiliary elastic portion is connected to a contacting part; and
an elastic part connected to the inner side fixing part and the outer side fixing part;
wherein before the at least one buffering part contacts the contacting part of the at least one leaf spring, a gap distance between the at least one buffering part and the contacting part of the at least one leaf spring is d, and the following condition is satisfied:

$$0.0 \text{ mm} < d < 0.15 \text{ mm}.$$

2. The camera module of claim 1, wherein a width of the auxiliary elastic portion is t, and the following condition is satisfied:

$$0.05 \text{ mm} < t < 0.5 \text{ mm}.$$

3. The camera module of claim 1, wherein a width of the auxiliary elastic portion is larger than a width of the elastic part.

4. The camera module of claim 3, wherein the width of the elastic part is w, the width of the auxiliary elastic portion is t, and the following condition is satisfied:

$$0.05 < w/t < 0.95.$$

5. The camera module of claim 1, wherein the inner side fixing part, the elastic part, and the contacting part of the at least one leaf spring are arranged in a ring shape.

6. The camera module of claim 1, wherein the outer side fixing part of the at least one leaf spring is farther from the plastic barrel than the contacting part from the plastic barrel.

7. The camera module of claim 1, wherein the plastic barrel is a threadless structure.

8. The camera module of claim 1, wherein the gap distance between the at least one buffering part and the contacting part of the at least one leaf spring is d, and the following condition is satisfied:

$$0.0 \text{ mm} < d < 0.10 \text{ mm}.$$

9. The camera module of claim 1, wherein the at least one buffering part is correspondent to the at least one contacting part, and an area of the at least one buffering part is smaller than an area of the at least one contacting part.

10. The camera module of claim 9, wherein the area of the at least one buffering part is Ab, the area of the at least one contacting part is Ac, and the following condition is satisfied:

$$0.01 < Ab/Ac < 0.30.$$

11. The camera module of claim 1, wherein before the plastic barrel contacts at least one of the metal yoke and the holder, the at least one buffering part of the plastic barrel contacts the contacting part of the leaf spring.

12. The camera module of claim 1, wherein a number of the leaf spring is at least two, the at least two leaf springs are respectively an upper leaf spring and a lower leaf spring, the upper leaf spring is connected to one end of the plastic barrel farther from the holder, and the lower leaf spring is connected to the other end of the plastic barrel closer to the holder.

13. The camera module of claim 12, wherein a number of the buffering part is at least two, the at least two buffering parts are respectively an upper buffering part and a lower buffering part, the upper buffering part is connected to the end of the plastic barrel farther from the holder, the lower buffering part is connected to the other end of the plastic barrel closer to the holder, and a projection of the upper buffering part and a projection of the lower buffering part which are both along a direction from the plastic barrel to the holder are not overlapped.

14. An electronic device, comprising:
the camera module of claim 1; and
an image sensor disposed on an image surface of the camera module.

* * * * *